United States Patent [19]

Kohmura et al.

[11] 3,984,605
[45] Oct. 5, 1976

[54] HEAT SENSITIVE RECORDING MATERIAL CONTAINING DECOLORIZING AGENT

[75] Inventors: Isao Kohmura; Kiyoshi Futaki; Kohzo Haino, all of Nagaokakyo, Japan

[73] Assignee: Mitsubishi Paper Mills, Ltd., Japan

[22] Filed: June 23, 1975

[21] Appl. No.: 589,130

Related U.S. Application Data

[62] Division of Ser. No. 413,387, April 21, 1975, Pat. No. 3,916,068.

[30] Foreign Application Priority Data

Nov. 8, 1972 Japan............................. 47-111206
June 20, 1973 Japan............................. 48-68805

[52] U.S. Cl................................. 428/411; 428/477; 428/478; 428/537; 428/500; 428/913; 427/145; 427/148

[51] Int. Cl.² ........................................... B41M 5/18

[58] Field of Search .......... 428/411, 488, 477, 478, 428/500, 537, 913

[56] References Cited

UNITED STATES PATENTS

| | | | |
|---|---|---|---|
| 3,167,444 | 1/1965 | Baumann et al. | 428/537 |
| 3,241,997 | 3/1966 | Schutzner | 428/537 X |
| 3,539,375 | 11/1970 | Baum | 428/537 X |
| 3,664,858 | 5/1972 | Huffman | 428/913 X |
| 3,916,068 | 10/1975 | Kohmura et al. | 428/411 |

*Primary Examiner*—P. C. Ives
*Attorney, Agent, or Firm*—Cushman, Darby & Cushman

[57] ABSTRACT

In a heat sensitive recording material comprising a support having a heat sensitive layer or layers thereon which comprise colorless or palely colored chromogenic substance and phenolic substance capable, upon heating, of causing color formation of said chromogenic substance, at least one organic amine derivatives are contained as a decolorizing agent in said heat sensitive layer or another layer adjacent to said heat sensitive layer. Using this recording material, two colors which are clearly distinguishable can be obtained.

8 Claims, No Drawings

HEAT SENSITIVE RECORDING MATERIAL CONTAINING DECOLORIZING AGENT

This is a division of application Ser. No. 413,387 filed Apr. 21, 1975, now U.S. Pat. No. 3,916,068.

The present invention relates to a heat sensitive recording material. More particularly, it relates to a heat sensitive recording material characterized in that as a decolorizing agent an organic amine derivative is contained in a heat sensitive layer comprising a normally colorless or palely colored chromogenic substance and a phenolic substance capable of causing coloration of said chromogenic substance upon heating or a layer adjacent to said heat sensitive layer.

Hitherto, heat sensitive recording materials comprising the combination of a chromogenic substance such as Crystal Violet lactone and a phenolic substance such as 4,4'-isopropylidene diphenol is mentioned in, for example, Japanese Patent Publication No. 14039/70.

At present, the heat sensitive recording materials are used as recording papers for printing by thermal printer such as desk-top electronic calculator or telefax, or printing by thermal pen in various industrial recorders. However, such recording materials as capable of forming distinguishable two or three colors on the same sheet have further been demanded. According to such method, two or three heat sensitive layers which have different color forming temperatures and simultaneously form different colors are coated on a sheet and thus mono color is formed by heating at a lower temperature and a blended color is formed by heating at a higher temperature. However, thus obtained mono color and blended color cannot be clearly distinguished from each other, and this method is not preferred for practical purpose.

The object of the present invention is to provide a multi color forming heat sensitive recording material which comprises heat sensitive layer or layers which have different color forming temperatures and are coated on one sheet, according to which mono colors can be formed by both high temperature printing and low temperature printing by changing the printing temperature and clearly distinguishable colors can be formed.

In order to accomplish said object, the inventors have made researches in an attempt to attain clearly distinguishable colors by employing combination of only mono colors instead of the combination of mono color and blended color. As the result, it has been found that when an organic amine derivative is contained in a heat sensitive component-containing layer or an adjacent layer, color is formed at a temperature within a certain range, but is not formed at a temperature higher than said range.

That is, when a heat sensitive layer containing an organic amine derivative and another heat sensitive layer which contains no amine derivative and forms color different from the color formed in said heat sensitive layer containing the organic amine derivative at a higher temperature than the temperature at which said amine-containing layer forms color are coated, at a low temperature the organic amine derivative-containing layer firstly forms color and at a higher temperature said organic amine derivative-containing layer is decolorized and only said layer which forms color at the higher temperature forms color. Thus, it has become possible to obtain mono colors different in hue from each other at both high and low temperatures.

In the above case, the amine derivative is contained in one of the two heat sensitive layers. However, a heat sensitive recording material having only one heat sensitive layer which contains chromogenic substance, phenolic substance and the amine derivative is also possible, but in this case it is necessary that the heat sensitive layer contains two kinds of the chromogenic substances and the phenolic substances, respectively.

Furthermore, when the organic amine derivative and a chromogenic substance which forms a color with said organic amine derivative are coated as an under layer and a heat sensitive layer comprising a chromogenic substance and a phenolic substance is coated thereon as an upper layer, the upper heat sensitive layer forms color at a low temperature and this upper heat sensitive layer is decolorized and the under layer forms color at a high temperature. Thus, mono colors can be obtained in both of the two layers.

In case of adding the organic amine derivative to the heat sensitive layer containing the chromogenic substance and the phenolic substance in the present invention, it is naturally required that the melting point of the organic amine derivative is higher than that of the phenolic substance, namely, the color forming temperature. Especially, the melting point of the organic amine derivative is preferably 10°C – 50°C higher than that of the phenolic substance. Moreover, it is necessary that the organic amine derivative is insoluble in the solvent in which the chromogenic substance and the phenolic substance are dispersed. However, when the organic amine derivative is coated as a separate under layer and a heat sensitive layer is coated thereon or the organic amine derivative layer is provided between two heat sensitive layers, the melting point of the organic amine derivative should not necessarily be higher than that of the phenolic substance. Furthermore, even such organic amine derivatives as quaternary ammonium salts which decompose at higher than 200°C and have no melting point or those which have a high melting point and do not melt with generally employable quantity of heat may be used in combination with a substance which melts upon heating to cause melting of the organic amine derivative. Moreover, the organic amine derivatives which are liquid at normal temperature may also be used in the same manner as the solid organic amine derivatives with use of an appropriate separating agent, namely, a substance which is insoluble in the organic amine derivative and is, upon heating, molten to cause fluidization of the organic amine derivative. However, those which are solid at normal temperature and have the melting point of 200°C or less are generally preferred.

In the present invention according to which the organic amine derivative is used in combination with the normally colorless or palely colored chromogenic substance and the phenolic substance which causes coloration of said chromogenic substance upon heating, the mechanism of coloration and decoloration is considered as follows: When heat is applied to the heat sensitive layer, the phenolic substance is firstly molten and acts on the chromogenic substance to cause coloration and when heat is further applied and the temperature reaches a certain temperature, the organic amine derivative is molten and basic property of the organic amine derivative predominates over the effect of the phenolic substance to result in a basic atmosphere and to open lacton ring of the chromogenic substance to cause decoloration.

Instead of adding the organic amine derivative to the heat sensitive layer as explained above, the amine derivative layer may also be provided on or under the heat sensitive layer. In this case, the organic amine derivative is not required to be insoluble in solvent in preparation of a coating layer containing the organic amine derivative.

Amount of the organic amine derivative used may vary depending upon the conditions mentioned above, but may be within the range of 10 – 500 % of the phenolic substance. When said amount is less than 10 %, the decoloration effect is insufficient and when more than 500 %, the decoloration effect is no longer so much increased.

The relative amounts of colorless or palely colored chromogenic substance, the phenolic substance and binder may very in wide ranges, but generally the phenolic substance is in an amount of 1 – 100 parts by weight, preferably 3 – 30 parts by weight per one part by weight of the chromogenic substance and the binder is in an amount of 5 – 50 parts by weight, preferably 15 – 40 parts by weight of the total solid matter in the heat sensitive coating liquid.

The organic amine derivatives used in the present invention may be classified into the following four groups:

1. Those represented by the general formula:

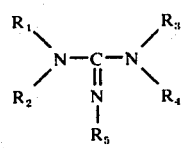

[wherein $R_1$, $R_2$, $R_3$, $R_4$ and $R_5$ represent hydrogen, lower alkyl, cyclic alkyl, aryl which may contain substituent selected from a lower alkyl, alkoxy, nitro and/or halogen, aralkyl, amino, alkylamino, acylamino, carbamoylamino, or benzimidazole group].

2. Those represented by the general formula:

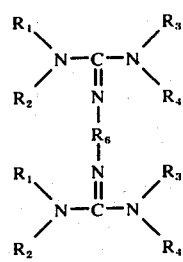

[wherein $R_1$, $R_2$, $R_3$, $R_4$ and $R_5$ have the same meanings as defined above and $R_6$ represents lower alkylene, phenylene or

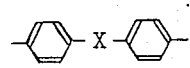

(wherein X is a lower alkylene, S, O, $S_2$, $SO_2$ or a single bond)].

3. Those represented by the general formula:

(wherein $R_1$, $R_2$ and $R_3$ represent hydrogen, alkyl of 1 – 20 carbon atoms, amino substituted alkyl, cycloalkyl, aralkyl, aryl or heterocyclic ring residues and at least two of $R_1$, $R_2$ and $R_3$ may bond to each other to form a ring including the N in said general formula).

4. Quaternary ammonium salts

For easy understanding, these quaternary ammonium salts may be further classified into the following five groups having the following general formulas, but the present invention should not be limited to them.

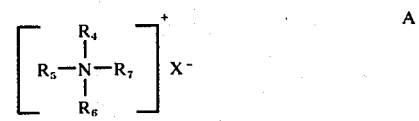
A (wherein $R_4$ – $R_7$ represent hydrogen, alkyl groups of 1 – 20 carbon atoms, amino substituted alkyl groups, cycloalkyl groups, aralkyl groups, aryl group or heterocyclic residues, at least two of $R_4$ – $R_7$ may bond to each other to form a ring including the N in said general formula and X represents a counter anion).

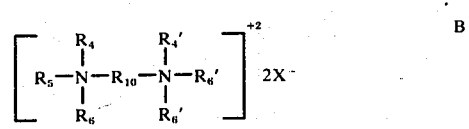
B

[wherein $R_4$ – $R_6$ and $R_4'$ – $R_6'$ represent hydrogen, alkyl groups of 1 – 20 carbon atoms, amino substituted alkyl groups, cycloalkyl groups, aralkyl groups, aryl group or heterocyclic residues, at least two of $R_4$ – $R_6$ and at least two of $R_4'$ – $R_6'$ may bond to each other to form a ring including the N in said general formula or $R_6$ and $R_6'$ may bond to each other to form a ring including the N in the general formula, $R_{10}$ represents alkylene group of 1 – 20 carbon atoms, xylylene group, allylene group, a single bond or

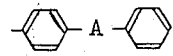

(wherein A represents a single bond, alkylene, oxygen or sulfur) and X represents a counter anion].

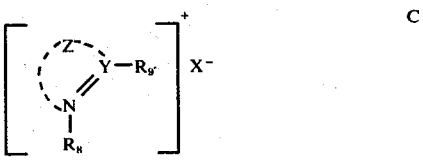
C (wherein $R_8$ represents an alkyl group of 1 – 20 carbon atoms or an aralkyl group, $R_9$ represents hydrogen, an alkyl group, an aralkyl group or phenyl group, Y and Z represent elements necessary for formation of a heterocyclic ring together with N in the general formula, Y represents carbon, Z represents carbon, oxygen, sulfur and/or nitrogen and X represents a counter anion).

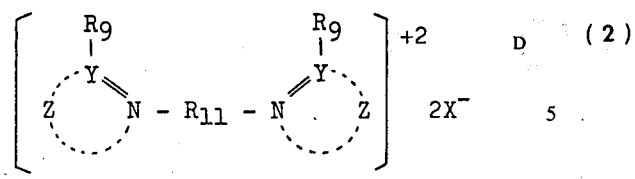    D  (2)

[wherein $R_9$ represents hydrogen, an alkyl group, an aralkyl group or phenyl group, $R_{11}$ represents an alkylene group, an allylene group, xylylene group, a single bond or

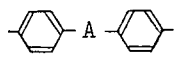    (3)

(wherein A represents a single bond; an alkylene group, oxygen or sulfur), Y and Z represent elements necessary for formation of a heterocyclic ring together with N in the formula, Y represents carbon, Z represents carbon, oxygen, sulfur and/or nitrogen and X represents a counter anion].

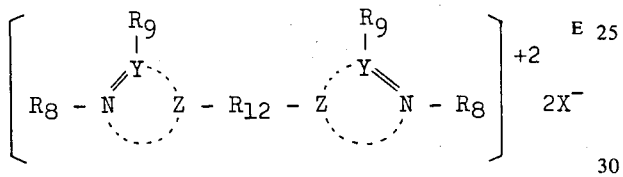    E  (4)

[wherein $R_8$ represents an alkyl group of 1 – 20 carbon atoms or an aralkyl group, $R_9$ represents hydrogen, an alkyl group, an aralkyl group or phenyl group, $R_{12}$ represents an alkylene group, an allylene group, a xylylene group, a single bond or

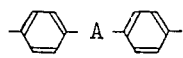

(wherein A represents a single bond, an alkylene group, oxygen or sulfur), Y and Z represent elements necessary for formation of a heterocyclic ring together with N in the formula, Y represents carbon, Z represents carbon, oxygen, sulfur and/or nitrogen and X represents a counter anion].

The counter anions referred to above include halogens, naphthalenetrisulfonic acid, alkylbenzene sulfonic acids, benzenesulfonic acid, benzenesulfinic acid, alkyldiphenyletherdisulfonic acids, sulfamic acid, $BF_4$, $ClO_4$, $B(C_6H_5)_4$, $PF_6$, etc.

Specific examples of the organic amine derivatives used in the present invention are enumerated below.

First, examples of guanidine derivatives are shown in Table I in which

"  "

means cyclohexyl group.

Table I (1) 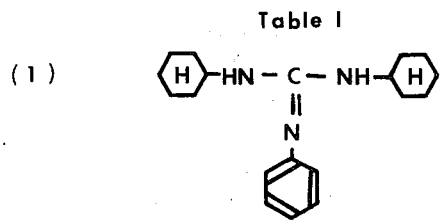

(2) 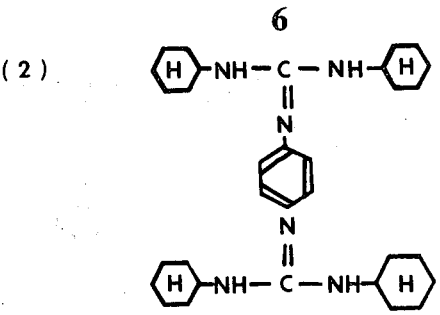

(3) 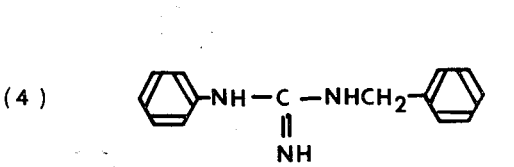

(4) 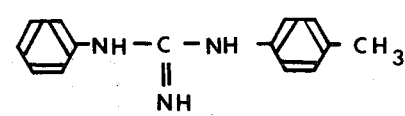

(5) 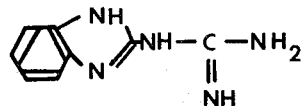

(6) 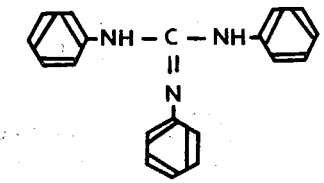

(7) 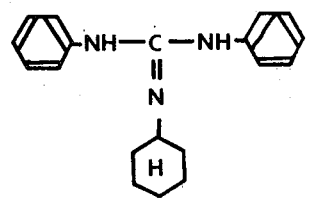

(8) 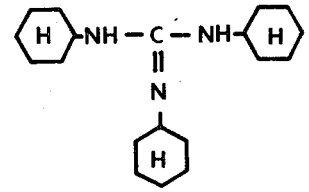

(9) 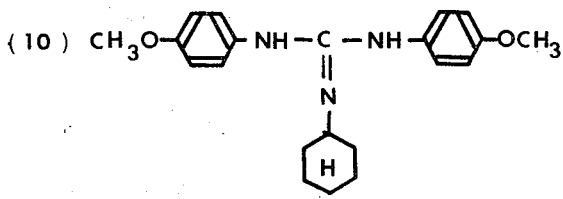

(10) 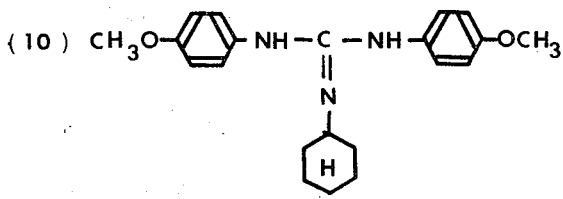

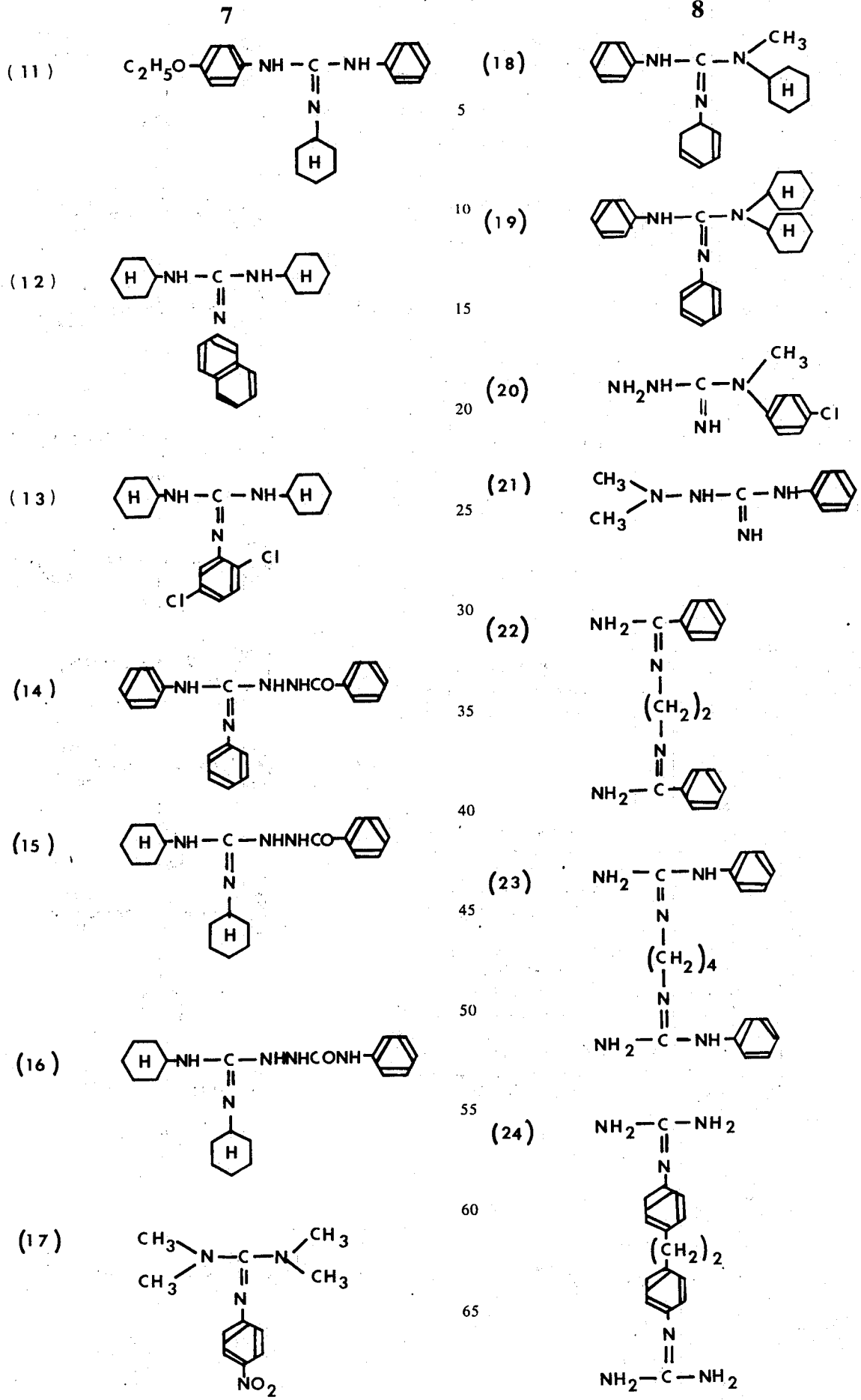

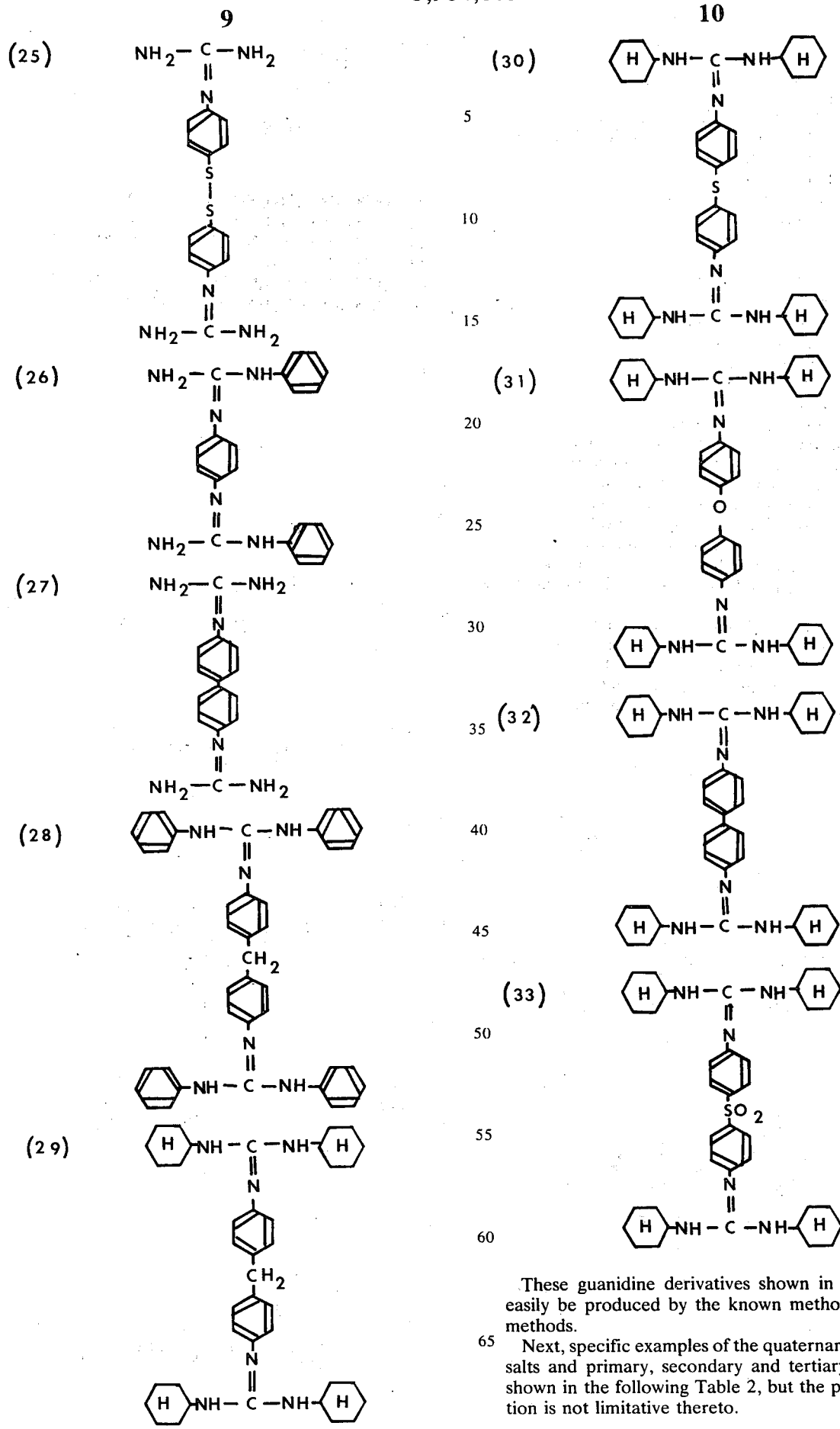
These guanidine derivatives shown in Table 1 can easily be produced by the known methods or similar methods.
Next, specific examples of the quaternary ammonium salts and primary, secondary and tertiary amines are shown in the following Table 2, but the present invention is not limitative thereto.

Table 2

1. Hexadecylamine
2. Tribenzylamine
3. N,N,N',N'-tetrabenzylethylenediamine
4. N,N,N',N'-tetrabenzylhexamethylenediamine
5. Decamethylenediamine
6. Tricyclohexylamine
7. N,N'-dibenzylpiperazine
8. Dioctadecylamine
9. 2-Aminobenzoxazole
10. 2-Aminobenzothiazole
11. 2-Aminobenzoimidazole
12. Quinine
13. Cyclohexyldibenzylamine
14. Octadecylbenzylamine
15. Octadecylamine
16. Octamethylenediamine
17. N-Octadecylbenzylamine
18. N-octadecylphenethylamine
19. Dodecyltrimethylammonium chloride
20. Hexadecyltrimethylammonium chloride
21. Octadecyltrimethylammonium chloride
22. Soya-trimethylammonium chloride
23. Benzyltrimethylammonium chloride
24. Benzyltrimethylammonium chloride
25. Di-Coconut dimethylammonium chloride
26. Di-hydrogenated tallow-dimethylammonium chloride
27. Di-lauryldimethylammonium chloride
28. Methyldodecylbenzylammonium iodide
29. Diethylbenzylammonium chloride
30. Hexyldibenzylammonium chloride
31. Dimethyl-butylbenzylammonium chloride

(32) 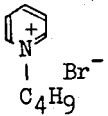  (33) 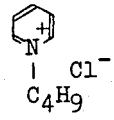

(34) 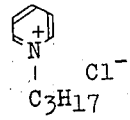  (35) 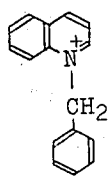

(36) 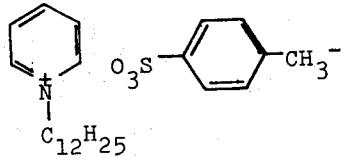

(37) (38)

(39) 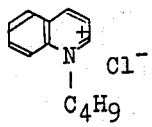  (40) 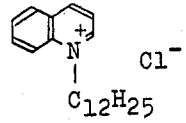

41. $[(CH_3)_3N.(CH_2)_6N(CH_3)_3]^{+2}(ClO_4)_2^{-2}$
42. $[(CH_3)_3N.(CH_2)_6N(CH_3)_3]^{+2}(BF_4)_2^{-2}$
43. $[(CH_3)_3N.(CH_2)_6N(CH_3)_3]^{+2}(H_3COSO_3)_2^{-2}$
44. $[(CH_3)_3N.(CH_2)_{10}N(CH_3)_3]^{+2}(OSO_3CH_3)_2^{-2}$
45. $[(CH_3)_3N.(CH_2)_3N(CH_3)_3]^{+2}(OSO_3CH_3)_2^{-2}$
46. $[(CH_3)_3N.(CH_2)_2N(CH_3)_3]^{+2}(ClO_4)_2^{-2}$

(47) 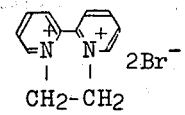

(48) 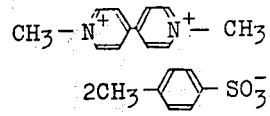

(49) 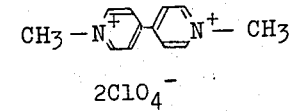

(50) 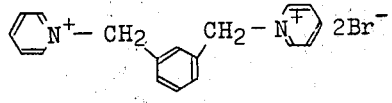

(51) 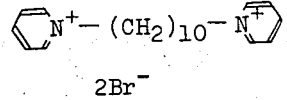

(52) 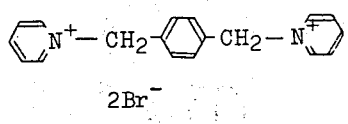

(53) 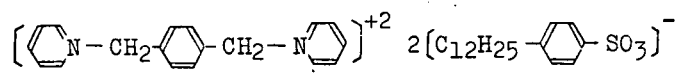
(54) 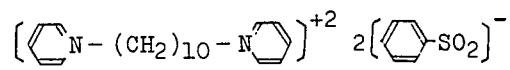
(55) 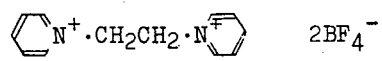
(56) 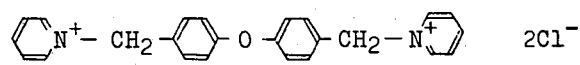
(57) 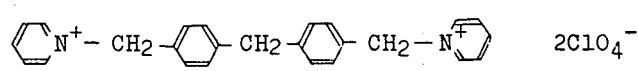
(58) 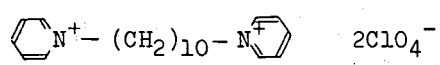
(59) 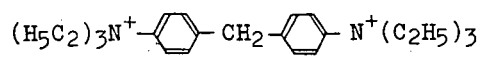
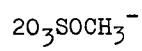
(60) 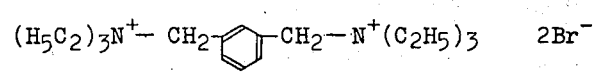
(61) 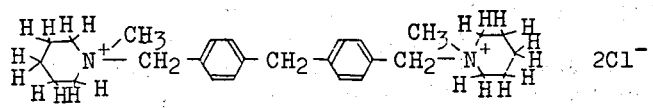
(62) 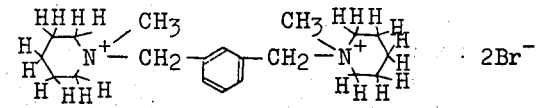
(63) 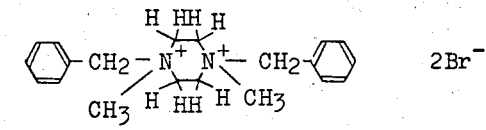
(64) 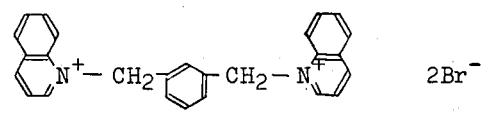

(65) 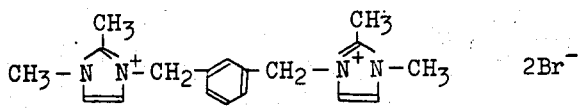 2Br⁻

(66) 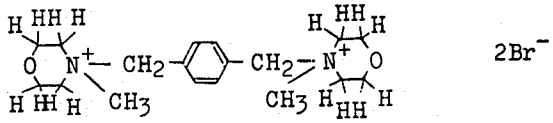 2Br⁻

(67) 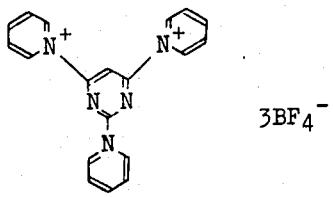 3BF₄⁻

(68) 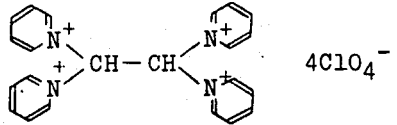 4ClO₄⁻

The organic amine derivatives shown in the above Table 2 can easily be produced by the known methods or the similar methods.

Two or more of these organic amine derivatives may be used in combination to result in reduction of decolorization temperature (reduction of melting point due to mixed melting). Thus, it becomes possible to adjust the decolorization temperature.

Typical examples of the colorless or palely colored chromogenic substances used in the present invention are enumerated below, but the present invention is not limitative to these compounds only.
  Crystal Violet lactone
  Malachite Green lactone
  3,3-Bis(para-dimethylaminophenyl)-6-aminophthalide
  3,3-Bis(p-dimethylaminophenyl)-6-(p-toluenesulfoamide)phthalide
  3-Diethylamino-7-(N-methylanilino)fluoran
  3-Diethylamino-7-(N-methyl-p-toluidino)fluoran
  3-Diethylamino-6-methoxyfluoran
  3-Diethylamino-7-chlorofluoran
  3-Diethylamino-6-methyl-7-chlorofluoran
  3-Diethylamino-7-phenylfluoran
  3-Morpholino-5,6-benzofluoran
  3-Diethylamino-5-methyl-7-dibenzylaminofluoran
  3-Diethylamino-7-dibenzylaminofluoran
  3-Diethylamino-7,8-benzofluoran
  3-Cyclohexylamino-6-chlorofluoran
  Benzo-β-naphthospiropyran The phenolic substances used in the present invention are those which are liquefied and/or gasified at normal temperature, preferably at 70°C or higher to react with said chromogenic substances to cause coloration of the chromogenic substances and these phenolic substances include carboxylic acids having phenolic hydroxyl group.

Typical examples of these phenolic substances are as follows:
  4,4'-Isopropylidenediphenol
  4,4'-Isopropylidenebis(2-chlorophenol)
  4,4'-Isopropylidenebis(2-tert-butylphenol)
  4,4'-sec-Butylidenediphenol
  4,4'-(1-methyl-n-hexylidene)diphenol
  4-Phenylphenol
  4-Hydroxydiphenoxide
  Methyl-4-hydroxybenzoate
  Phenyl-4-hydroxybenzoate
  4-Hydroxyacetophenone
  Gallic acid
  Phenyl gallate
  Salicylic acid anilide
  Salicylic acid
  Phenyl salicylate
  4,4'-Cyclohexylidenediphenol
  4,4'-Cyclohexylidenebis(2-methylphenol)
  4,4'-Pentylidenediphenol
  4,4'-Thiobis(6-tert-butyl-3-methylphenol)
  Novolak phenol resins
  Halogenated novolak phenol resins Among them, phenolic substances containing at least 2 hydroxyl groups in one molecule are especially preferred.

The heat sensitive recording material of the present invention can be summarily produced by the following method. That is, each of the phenolic substance, the chromogenic substance and the organic amine derivative is separately ground into particles of less than several μ and dispersed in a binder of an appropriate concentration by a grinder such as ball mill. Thus obtained three dispersions are mixed and to the mixture are optionally added a whiteness increasing agent, a wetting agent and other various fillers to obtain a heat sensitive coating liquid. The resultant coating liquid is coated on an appropriate support and is dried. As a binder, generally known water soluble binders such as polyvinyl alcohol, methylcellulose, carboxymethylcellulose, hydroxyethylcellulose, gum arabic, casein, gelatin, styrene-maleic anhydride copolymer, starch, polyacrylates, styrene-butadiene latex emulsion, etc. and petroleum resins such as terpene resin, cyclic rubber, etc. may be used.

Moreover, the organic amine derivative may also be added to an upper layer on the heat sensitive layer or an under layer below the heat sensitive layer to obtain the same result.

As the support, paper is ordinarily used, but synthetic resin films, laminate paper and woven fabric sheets may also be used.

In the present invention, the organic amine derivative may be contained in the heat sensitive layer, or the upper or under layer of the heat sensitive layer to attain decolorization effect, but when the organic amine derivative is contained in a layer other than the heat sensitive layer, preferably those which have relatively higher decolorization effect than those to be used in the heat sensitive layer should be used. In case of using those of lower decolorization effect, decolorization is not completed and some color is formed.

When said phenomenon is utilized in dichromatic color formation, e.g., by using two heat sensitive layers and the organic amine derivative having relatively low decolorization effect is contained in either one of said two heat sensitive layers, the heat sensitive layer containing the organic amine derivative is, of course, decolorized at a temperture higher than a certain temperature, but the adjacent heat sensitive layer is not completely decolorized and some color is formed. Thus, dichromatically developed color images of single colors are obtained.

In the above case if an organic amine derivative having a high decolorization effect is employed in place of that of low decolorization effect, not only the heat sensitive layer containing the organic amine derivative, but also the adjacent heat sensitive layer is decolorized at a temperature higher than a certain temperature. In such case, therefore, e.g. an intermediate layer can be provided between the two heat sensitive layers to prevent the diffusion of the organic amine derivative molten by heat printing. Alternatively, instead of providing the intermediate layer, complete decolorization may also be prevented by increasing the amount of the heat sensitive composition in the adjacent layer than the usually employed amount.

The following examples are included for a further understanding of the invention.

| Preparation of heat sensitive coating liquid (Liquid A) | |
|---|---|
| Liquid (a) | |
| Crystal Violet lactone | 1 g |
| 20 % Aqueous solution of polyvinyl alcohol | 5 g |
| Water | 15 g |
| Liquid (b) | |
| 4,4'-(1-Methyl-n-hexylidene) diphenol | 5 g |
| 20 % Aqueous solution of polyvinyl alcohol | 25 g |
| Water | 75 g |
| Liquid (c) | |
| The compound (1) in the Table 1 | 8 g |
| 20 % Aqueous solution of polyvinyl alcohol | 40 g |
| Water | 120 g |

Each of said liquids (a), (b) and (c) were separately ball-milled for 2 days and were mixed. To the mixture were added 20 g of 50 % wheat starch dispersion, 5 g of 20 % wax emulsion (Trade name "Repol No. 50" produced by Daikyo Chemical K.K.) and 1 cc of surfactant "Dowfax 2A-1" (produced by Dow Chemical Co.) to obtain heat sensitive coating liquid A.

PREPARATION OF HEAT SENSITIVE COATING LIQUID (LIQUID B)

Coating liquid B was prepared in the same manner as of the preparation of the Liquid A except that 3-diethylamino-7-chlorofulorane was substituted for Crystal Violet lactone in liquid (a), 4,4'-isopropylidenediphenol was substituted for 4,4'-(1-methyl-n-hexylidene)diphenol in liquid (b) and compound (2) in Table 1 was substituted for compound (1) in Table 1 in liquid (c).

EXAMPLE 1

Liquid A prepared as mentioned above was coated on an ordinary paper having a basis weight of 50 g/m$^2$ in a dried coating weight of 8 g/m$^2$ and the coated film was dried to obtain a heat sensitive paper.

This heat sensitive recording paper formed blue color at 90°C – 120°C, but formed no color at higher than 120°C.

Heat sensitive recording papers were also produced in the same manner as mentioned above except that compound (1) in Table 1 in liquid (c) in Liquid A was replaced with guanidine derivatives as shown in Table 3. The results are shown in Table 3. As is clear from Table 3, when the guanidine derivatives were added, the heat sensitive recording papers formed color at a temperature within a certain range and did not form color at a temperature higher than said range.

Table 3

| Guanidine derivative | Range of color forming temperature | Temperature at which no color was formed | Note |
|---|---|---|---|
| None | Higher than 90°C | None | Not the present invention |
| Table 1 (1) | 90 – 120°C | Higher than 120°C | The present invention |
| Table 1 (2) | 90 – 130°C | Higher than 130°C | " |
| Table 1 (11) | 90 – 120°C | Higher than 120°C | " |
| Table 1 (14) | 90 – 130°C | Higher than 130°C | " |
| Table 1 (29) | 90 – 120°C | Higher than 120°C | " |
| Table 1 (30) | 90 – 110°C | Higher than 110°C | " |
| Table 1 (31) | 90 – 120°C | Higher than 120°C | " |
| Table 1 (32) | 90 – 120°C | Higher than 120°C | " |

Example 2

Only the liquid (c) in said Liquid A was coated on an ordinary paper having a basis weight of 50 g/m$^2$ in a dried weight of 2 g/m$^2$ and was dried. Then, a mixed liquid of liquids (a) and (b) to which 0.5 cc of Dowfax 2A-1 was added was coated upon the first layer in a dried coating weight of 3 g/m$^2$ and was dried to obtain a heat sensitive recording paper. This heat sensitive recording paper formed blue color at 90° – 120°C and formed no color at higher than 120°C.

EXAMPLE 3

Liquid (a) in said Liquid A where Crystal Violet lactone was replaced with 3-diethylamino-6-methyl-7-chlorofluorane and the liquid (b) in Liquid A where 4,4'-(1-methyl-n-hexylidene)diphenol was replaced with 4,4'-isopropylidenediphenol were separately ball-milled for 2 days and then the two liquids were mixed. To the mixture was added 0.6 g of Epiol E-100 (Trade name of a hardener manufactured by Nihon Yushi K.K.) and they were mixed to obtain a heat sensitive coating liquid. This heat sensitive coating liquid was coated on an ordinary paper having a basis weight of 50 g/m² in a dried coating weight of 3 g/m² and was dried and then said Liquid A was coated upon the first layer in a dried coating amount of 8 g/m² and dried to obtain a heat sensitive recording paper. This heat sensitive recording paper formed blue color at 90° – 120°C and formed red color at higher than 130°C. Substantially no blue color was incorporated into said red color. Thus, distinct two colors were obtained.

EXAMPLE 4

A heat sensitive recording paper was produced in the same manner as Example 1 with the exception that Liquid A was replaced with Liquid B. Thus obtained heat sensitive recording paper formed red color at 140° – 170°C, but formed no color at higher than 170°C.

EXAMPLE 5

A mixed liquid of liquids (a) and (b) of the Liquid B was coated on an ordinary paper having a basis weight of 50 g/m² in a dried coating weight of 3 g/m². Then, liquid (c) of the Liquid B to which 0.5 cc of Dowfax 2A-1 was added was coated upon said first layer in a dried coating weight of 2 g/m² and dried to obtain a heat sensitive recording paper exhibiting nearly the same properties as of Example 4.

EXAMPLE 6

The liquid (a) of the Liquid A and the liquid (b) of the Liquid A where 4,4'-(1-methyl-n-hexylidene)-diphenol was replaced with 4,4'-cyclohexylidene-bis(2-methylphenol) were mixed and to the mixture was further added 0.6 g of Epiol E-100 to obtain a heat sensitive coating liquid. This heat sensitive coating liquid was coated on an ordinary paper having a basis weight of 50 g/m² in a dried coating weight of 5 g/m² and dried. Then, the Liquid B was coated upon said first layer in a dried coating weight of 6 g/m² and dried to obtain a heat sensitive recording paper. This heat sensitive recording paper formed red color at 140° – 170°C and blue color at higher than 190°C. Substantially no red color was incorporated into the blue color and thus distinct two colors were obtained.

EXAMPLE 7

The dried coating weight of the first heat sensitive layer in the above Example 6 was changed to 3 g/m² and thereupon was coated an aqueous solution of polyvinyl alcohol containing a surfactant in a dried coating weight of 1 g/m² as an intermediate layer and dried. Then, the second heat sensitive layer in the Example 6 was further coated thereupon in a dried coating weight of 8 g/m² and was dried to obtain a heat sensitive recording paper, which exhibited nearly the same results as in Example 6.

Example 8

| Liquid (d) | |
|---|---|
| Compound (11) in Table 1 | 0.5 g |
| Compound (9) in Table 2 | 0.5 g |
| 10 % Aqueous solution of casein | 2 g |
| Water | 3 g |
| Liquid (e) | |
| Crystal Violet lactone | 1 g |
| 5 % Aqueous solution of polyvinyl alcohol | 1 g |
| Water | 2.2 g |

The liquids (c) and (b) in example 1 were added to said liquids (d) and (e) to obtain a heat sensitive coating liquid, which was coated on an ordinary paper having a basis weight of 50 g/m² in the same manner as described in Example 1. Thus obtained heat sensitive recording paper had nearly the same recording properties as those obtained in the preceding Examples.

Example 9

| Liquid (f) | |
|---|---|
| Compound (2) in Table 2 | 1 g |
| 10 % Aqueous solution of casein | 2 g |
| Water | 3 g |
| Liquid (g) | |
| Crystal Violet lactone | 1 g |
| 5 % Aqueous solution of polyvinyl alcohol | 1 g |
| Water | 2.2 g |
| Liquid (h) | |
| 4,4'-(1-methyl-n-hexylidene)-diphenol | 8 g |
| 5 % Aqueous solution of polyvinyl alcohol | 8 g |
| Water | 17.6 g |

The above Liquids (f), (g) and (h) were separately ball-milled for 2 days. The Liquid (f) was coated on an ordinary paper having a basis weight of 50 g/m² in a dried coating amount of 3 g/m² and dried. A heat sensitive coating liquid obtained by mixing said Liquids (g) and (h), 18 g of 10 % aqueous solution of polyvinyl alcohol and 1 cc of 10 % Dowfax 2A-1 was coated upon the first layer of the Liquid (f) in a dried coating weight of 3 g/m² and dried to obtain a heat sensitive recording paper. This recording paper formed blue color at 90° – 110°C and formed no color at higher than 110°C.

EXAMPLE 10

Heat sensitive recording papers were produced in the same manner as in Example 9 with the exception that the compounds enumerated in Table 4 were used in place of compound (2) in Table 2. In this case, when the compounds enumerated in Table 4 were water soluble, they were not required to be ball-milled. The results obtained from these recording papers are shown in Table 4. As is clear from Table 4, the recording papers containing the organic amine derivatives of the present invention were more excellent in decolorizing effect than those containing alcoholic decolorizing agents.

Table 4

| Decolorizing agent | Range of temperature at which color was formed | Temperature at which no color was formed | Degree of decolorization | Note |
|---|---|---|---|---|
| None | Higher than 90°C | None | X | Not the present invention |
| Polyethylene oxide | 90°–110°C | Higher than 120 °C | Δ | " |
| 2,4,6-Octatriene-1-ol | " | " | Δ | " |
| Compound (4) in Table 2 | " | " | O | The present invention |
| Compound (9) in Table 2 | " | " | O | The " |
| Compound (23) in Table 2 | " | " | O | " |

Table 4-continued

| Decolorizing agent | Range of temperature at which color was formed | Temperature at which no color was formed | Degree of decolorization | Note |
|---|---|---|---|---|
| Compound (33) in Table 2 | " | " | O | " |
| Compound (44) in Table 2 | " | " | O | " |
| Compound (56) in Table 2 | " | " | O | " |
| Compound (2) in Table 1 and Compound (4) in Table 2 in combination (1 : 1) | 90° – 100°C | Higher than 110 °C | O | " |

The marks which indicate the degree of decolorization mean as follows:
1. "O" means that the recording paper was decolorized to practically utilizable degree.
2. "Δ" means that the recording paper was decolorized, but the degree was such as not practically utilizable.
3. "X" means that the recording paper was not decolorized.

Example 11

Liquid (i)
- Compound (57) in Table 2 — 2 g
- Armowax (Trade name for methylenebisstearamide manufactured by Lion Armour Co.) — 1 g
- 10% Aqueous solution of casein — 6 g
- Water — 30 g The above Liquid (i) was ball-milled for 2 days and coated on an ordinary paper having a basis weight of 50 g/m² in a dried coating weight of 5 g/m² and was dried. A mixed liquid of 18 g of 10 % aqueous solution of polyvinyl alcohol, 10 % Dowfax 2A-1 and Liquids (g) and (h) where 4,4'-isopropylidenediphenol was substituted for 4,4'-(1-methyl-n-hexylidene)diphenol in Example 9 was coated upon the first layer in a dried coating weight of about 3 g/m² and was dried to obtain a heat sensitive recording paper. The compound (57) in Table 2 was a substance which decomposes at higher tha 260°C, but since it was a heat meltable substance, it exhibited decolorizing effect at about 180°C. Therefore, said heat sensitive recording paper formed blue color at 50° – 170°C and was decolorized at 180°C.

Example 12

Liquid (j)
- 3-Diethylamino-7-chlorofluorane — 1 g
- 5% Aqueous solution of hydroxyethyl cellulose — 5 g
- Water — 44 g Liquid (k)
- 4,4'-(1-Methyl-n-hexylidene)-diphenol — 6 g
- 5% Aqueous solution of hydroxyethyl cellulose — 30 g
- Water — 26.4 g Liquid (l)
- Compound (10) in Table 2 — 10 g
- 5% Aqueous solution of hydroxyethyl cellulose — 50 g
- Water — 44 g The above Liquids (j), (k) and (l) were separately ball-milled for 2 days and then they were mixed to obtain a heat sensitive coating liquid, which was coated on an ordinary paper having a basis weight of 50 g/m² in a dried coating weight of about 5 g/m² and dried to obtain a heat sensitive recording paper. This recording paper formed a red color at 90° – 110°C and was decolorized at higher than 120°C.

Example 13

Liquid (m)
- Compound (21) in Table 2 — 1.0 g
- Piccolite (Trade name for Terpene resin manufactured by Esso Standard Oil Co.) — 3.0 g
- Petroleum — 50 g Liquid (n)
- 3-Diethylamino-6-methyl-7-chlorofluorane — 1 g
- 20% Aqueous solution of Maron MS (Trade name for Styrene-maleic anhydride copolymer manufactured by Daido Kogyo K.K.) — 1.3 g
- Water — 2.2 g Liquid (o)
- 4,4-sec-Butylidenediphenol — 8 g
- 20% Aqueous solution of Maron MS — 10 g
- Water — 17.6 g A mixed dispersion of ferric stearate, gallic acid and titanium oxide was prepared in petroleum with use of a suitable binder such as Piccolite. The resultant dispersion was coated on an ordinary paper having a basis weight of 50 g/m². Thereupon was coated ball-milled Liquid (m) in a dried coating weight of about 3 g/m². A mixture of ball-milled Liquids (n) and (o) was coated upon said layer of Liquid (m) in a dried coating weight of 3 g/m² and dried to obtain a heat sensitive recording paper. This recording paper formed red color at 110° – 130°C and this red color completely disappeared at higher than 130°C and black color was formed in the under layer.

Example 14

Liquid (p)
- Compound (8) in Table 2 — 1 g
- 10% Aqueous solution of casein — 2.5 g
- Water — 5 g Liquid (q)
- 2',4',5',7'-tetrabromofluoroscein — 1 g
- Water — 3.2 g Liquid (r)
- Crystal Violet lactone — 1 g
- Water — 3.2 g Liquid (s)
- 4,4'-(1-Methyl-n-hexylidene)-diphenol — 8 g
- 5% Aqueous solution of Celogen 7-A (Trade name for carboxymethylcellulose manufactured by Daiichi Kogyo Seiyaku K.K.) — 8 g
- Water — 17.6 g Liquids (p), (q), (r) and (s) were separately ball-milled for 1 – 2 days. Then, Liquid (p) was coated on an ordinary paper having a basis weight of 50 g/m² in a dried coating weight of 3 g/m² and dried. Liquids (q), (r) and (s) were mixed and 30 g of 10 % Celogen 7-A, 2 cc of 10 % Dowfax and 1.5 g of 20 % Repol No. 50 (Trade name for wax emulsion manufactured by Daikyo Kagako K.K.) was further added thereto. The resultant mixture was coated upon said first layer. The resultant heat sensitive recording paper formed blue color at 90° – 120°C and red color at higher than 130°C.

EXAMPLE 15

Example 3 was repeated except that the all coating liquids were coated as one layer on the ordinary paper to obtain the same results as those in Example 3. That is, the following liquids were separately ball-milled and dispersed for 2 days and then these dispersions were mixed. To the resultant mixture was added 0.5 cc of Dowfax 2A-1 and the liquid obtained was coated on the ordinary paper in a dried coating weight of 3 g/m² and dried.

| | | |
|---|---|---|
| (1) | Crystal Violet lactone | 1 g |
| | 20% Aqueous solution of polyvinyl alcohol | 5 g |
| | Water | 15 g |
| (2) | 4,4'-(1-Methyl normal hexylidene)diphenol | 5 g |
| | 20% Aqueous solution of polyvinyl alcohol | 25 g |
| | Water | 15 g |
| (3) | 3-Diethylamino-6-methyl-7-chlorofluorane | 1 g |
| | 20% Aqueous solution of polyvinyl alcohol | 5 g |
| | Water | 15 g |
| (4) | 4,4'-Isopropylidenediphenol | 5 g |
| | 20% Aqueous solution of polyvinyl alcohol | 25 g |
| | Water | 75 g |
| (5) | Compound (1) in Table 1 | 8 g |
| | 20% Aqueous solution of polyvinyl alcohol | 40 g |
| | Water | 120 g |

EXAMPLE 16

Example 6 was repeated except that the liquid (c) in Liquid B was provided as an intermediate layer, namely, the upper and lower heat sensitive layers contained no organic amine derivative. The obtained heat sensitive recording paper exhibited nearly the same results as in Example 6.

What is claimed is:

1. In a heat sensitive recording material comprising a support having a heat sensitive layer or layers thereon which comprises colorless or light colored chromogenic substance and phenolic substance capable, upon heating, of causing color formation of said chromogenic substance, wherein at least one organic amine derivative in the amount of at least 10% by weight of the phenolic substance is contained as a decolorizing agent in said heat sensitive layer or another layer adjacent to said heat sensitive layer, said organic amine derivative being selected from the group consisting of primary, secondary and tertiary amines having the following general formula:

wherein $R_1$, $R_2$ and $R_3$ represent hydrogen, alkyl of 1 to 20 carbon atoms, amino substituted alkyl, cycloalkyl, aralkyl, aryl or heterocyclic ring residue and at least two of $R_1$, $R_2$ and $R_3$ can bond to each other to form a ring including the N in the general formula and quaternary ammonium salts.

2. A heat sensitive recording material according to claim 1, wherein said organic amine derivative is selected from the group consisting of primary, secondary and tertiary amines having the following general formula:

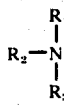

wherein $R_1$, $R_2$ and $R_3$ represent hydrogen, alkyl of 1 to 20 carbon atoms, amino substituted alkyl, cycloalkyl, aralkyl, aryl or heterocyclic ring residue and at least two of $R_1$, $R_2$ and $R_3$ can bond to each other to form a ring including the N in the general formula.

3. A heat sensitive recording material according to claim 1, wherein said organic amine derivative is selected from quaternary ammonium salts.

4. A heat-sensitive recording material according to claim 1 wherein said guanidine is contained in an amount of 10–500% by weight of the phenolic substance.

5. A heat-sensitive recording material according to claim 4 which forms color at a temperature of at least 90°C.

6. A heat-sensitive recording material according to claim 1 wherein the chromogenic substance is selected from the group consisting of
   Crystal Violet lactone;
   Malachite Green lactone;
   3,3-Bis(para-dimethylaminophenyl)-6-aminophthalide;
   3,3-Bis(p-dimethylaminophenyl)-6-(p-toluenesulfoamide)phthalide;
   3-diethylamino-7-(N-methylanilino)fluoran;
   3-Diethylamino-7-(N-methyl-p-toluidino)fluoran;
   3-Diethylamino-6-methoxyfluoran;
   3-Diethylamino-7-chlorofluoran;
   3-Diethylamino-6-methyl-7-chlorofluoran;
   3-Diethylamino-7-phenylfluoran;
   3-Morpholino-5,6-benzofluoran;
   3-Diethylamino-5-methyl-7-dibenzylaminofluoran;
   3-Diethylamino-7-dibenzylaminofluoran;
   3-Diethylamino-7,8-benzofluoran;
   3-Cyclohexylamino-6-chlorofluoran; and
   Benzo-β-naphthospiropyran.

7. A heat-sensitive recording material according to claim 6 wherein the phenolic substance is selected from the group consisting of
   4,4'-Isopropylidenediphenol;
   4,4'-Isopropylidenebis(2-chlorophenyl);
   4,4'-Isopropylidenebis(2-tert-butylphenol);
   4,4'-sec-Butylidenediphenol;
   4,4'-(1-methyl-n-hexylidene)diphenol;
   4-Phenylphenol;
   4-Hydroxydiphenoxide;
   Methyl-4-hydroxybenzoate;
   Phenyl-4-hydroxybenzoate;
   4-Hydroxyacetophenone;
   Gallic acid;
   Phenyl gallate;
   Salicylic acid anilide;
   Salicylic acid;
   Phenyl salicylate;
   4,4'-Cyclohexylidenediphenol;
   4,4'-Cyclohexylidenebis(2-methylphenol);
   4,4'-Pentylidenediphenol;
   4,4'-Thiobis(6-tert-butyl-3-methylphenol);
   novolak phenol resins; and
   halogenated novolak phenol resins.

8. A heat-sensitive recording material according to claim 1 wherein the phenolic substance is selected from the group consisting of
   4,4'-Isopropylidenediphenol;
   4,4'-Isopropylidenebis(2-chlorophenyl);
   4,4'-Isopropylidenebis(2-tert-butylphenol);
   4,4'-sec-Butylidenediphenol;

4,4'-(1-methyl-n-hexylidene)diphenol;
4-Phenylphenol;
4-Hydroxydiphenoxide;
Methyl-4-hydroxybenzoate;
Phenyl-4-hydroxybenzoate;
4-Hydroxyacetophenone;
Gallic acid;
Phenyl gallate;
Salicylic acid anilide;
Salicylic acid;
Phenyl salicylate;
4,4'-Cyclohexylidenediphenol;
4,4'-Cyclohexylidenebis(2-methylphenol);
4,4'-Pentylidenediphenol;
4,4'-Thiobis(6-tert-butyl-3-methylphenol);
novolak phenol resins; and
halogenated novolak phenol resins.

* * * * *

UNITED STATES PATENT OFFICE
CERTIFICATE OF CORRECTION

Patent No. 3,984,605     Dated  October 5, 1976

Inventor(s) Isao Kohmura, Kiyoshi Futaki and Kohzo Haino

It is certified that error appears in the above-identified patent and that said Letters Patent are hereby corrected as shown below:

Item [62] should read:

-- Division of Ser. No. 413,387, November 6, 1973, Pat, No. 3,916,068 --.

Signed and Sealed this

Fifteenth Day of February 1977

[SEAL]

Attest:

RUTH C. MASON
Attesting Officer

C. MARSHALL DANN
Commissioner of Patents and Trademarks